April 3, 1962 K. O. PARKER 3,028,164
METAL O-RING ASSEMBLY
Filed Aug. 30, 1957
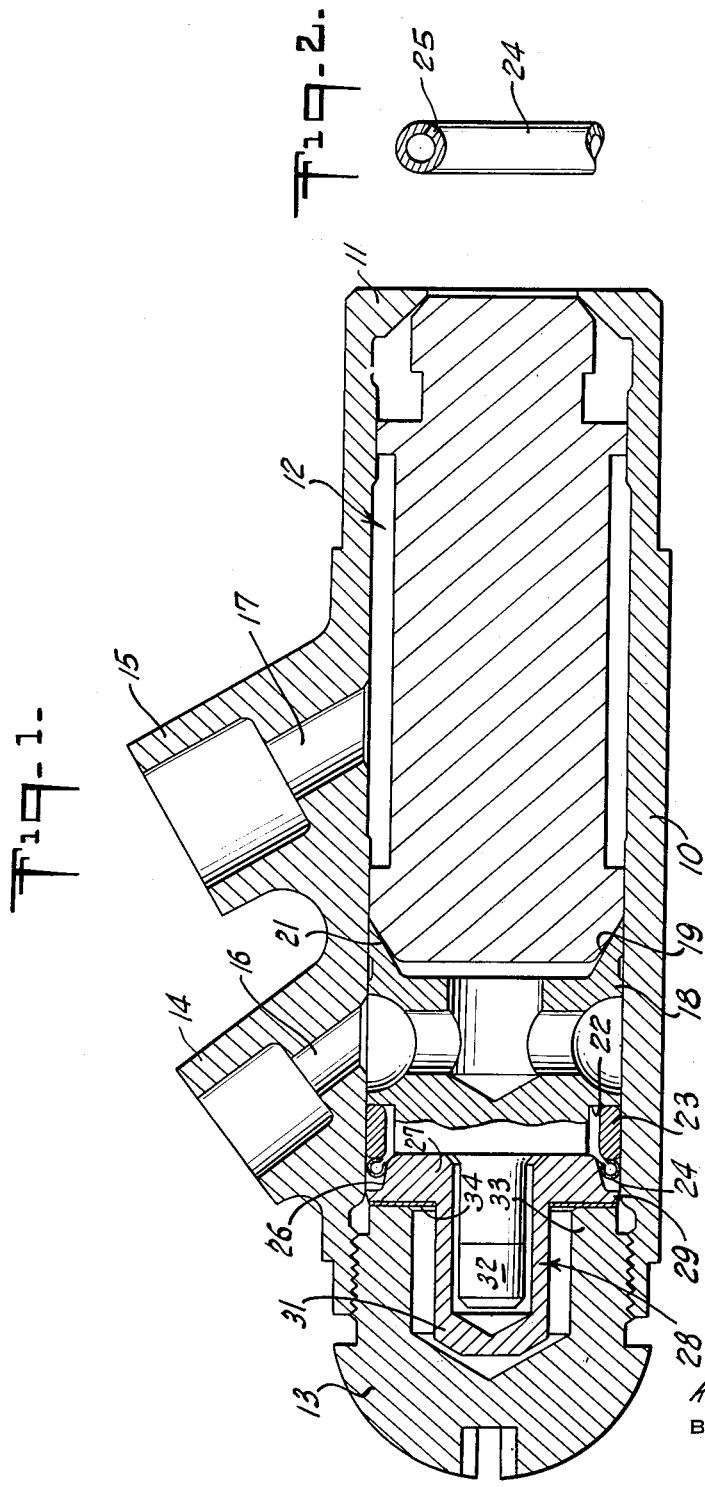
INVENTOR
KENNETH O. PARKER
BY
J E Beringer
ATTORNEY

United States Patent Office 3,028,164
Patented Apr. 3, 1962

3,028,164
METAL O-RING ASSEMBLY
Kenneth O. Parker, Dayton, Ohio, assignor to United Aircraft Products, Inc., Dayton, Ohio, a corporation of Ohio
Filed Aug. 30, 1957, Ser. No. 681,402
1 Claim. (Cl. 277—112)

This invention relates to sealing problems in the handling of fluids, particularly engine fuels, which are supplied at high pressure, as on the order of 500 pounds per square inch, and which may be at extreme temperatures, as in the range from −65° F. to +600° F.

More particularly is the invention concerned with O-ring type seals, especially the substitution of a hollow metal ring for the more conventional solid rubber or rubber-like ring. Thus, under conditions of high pressure and extreme temperature, the rubber or rubber-like O-ring tends to lose its elasticity with a consequent loss of effectiveness, and also becomes brittle and develops cracks allowing an escape of vapor which may be undesirable.

An object of the invention is to provide a sealing assembly, featuring a hollow metal O-ring, well suited for effective operation over relatively long periods of time under conditions of extreme pressure and temperature as described.

Another object of the invention is to provide a sealing ring assembly as described featuring a principle of self-pressurization as well as a means to apply a selected radially expansive action for more effective contact of the outer periphery of the sealing ring with a sealed surface.

A further object of the invention is to present a sealing assembly of the kind described especially adapted and arranged for substitution in existing equipment for more conventional sealing assemblies of the prior art.

Other objects and structural details of the invention will appear from the following description, when read in connection with the accompanying drawing, wherein:

FIG. 1 is a view in longitudinal section showing a sealing assembly in accordance with the instant inventive concept in an illustrated embodiment, such embodiment being disclosed in a nozzle in an engine fuel supply system and containing devices to meter and to filter the flowing fuel; and FIG. 2 is a detail view, enlarged with respect to FIG. 1, showing a hollow metal O-ring forming a part of the assembly of FIG. 1.

Referring to the drawing, a device of the kind described may comprise, as shown, a generally tubular body 10 open at its opposite ends and having at one end thereof an inturned flange 11 defining a seat for an inserted fuel metering and filtering device 12. The opposite end of the body 10 normally is closed by means including a removable cap 13 having a screw threaded mounting in the body. Intermediate the ends of the body 10 are external spaced apart bosses 14 and 15 containing respective passages 16 and 17 communicating with the interior of the body. The passages 16 and 17 serve as inlets for liquid fuel which is so admitted to the interior of the body 10 under high pressure and at temperatures which may be extreme as before indicated. The escape of the incoming fuel is blocked at one end by the closure cap 13. It flows or is discharged out the other end, by way of the opening as defined by the inturned flange 11, under the control of the device 12 which, as noted, is effective to filter the fuel and to meter the flow in a manner and by means which it is unnecessary to an understanding of the present invention to consider. Insofar as the present invention is concerned, it is merely necessary to note that the device 12 seats upon the flange 11, positively limiting movement of the device in that direction.

Beyond the device 12, in the opposite direction, is a bushing 18 suitably formed to conduct fuel to the device 12 from the inlet passage 16. At its one end, the bushing 18 has a generally concave face 19 receiving and mating with a generally convex configuration 21 on the adjacent end of the device 12. There is thus a substantially continuous contact of parts from the bushing 18 to the seating flange 11. At its opposite end, the bushing 18 is formed with a peripheral recess 22 in which is seated a spacer ring 23. The latter is constructed and arranged to serve as backup means for a hollow metal O-ring 24, the function of which is to inhibit the movement of high pressure fuel to the cap 13 where the fuel itself or vapors thereof might escape along the screw threads. The ring 24 is constructed of relatively thin metal, is compressible, from which condition it tends to recover with a natural resilience, and is formed with small diameter openings 25 which admit to the interior of the ring the pressure fluid under control. The operation of the ring is thus relatively unaffected by the pressure value of the fluid under control, and the ring is free to respond to changes in the position of the parts contacted thereby due to temperature change with a natural resilience.

Sealing contact is made by the ring 24 with the backup element 23, with the wall defining the interior bore of the body 10, and with an inclined or tapering surface 26 which is on the periphery of a reduced diameter extension 27 of a retainer member 28. The member 28 further includes a portion 29 of normal diameter adapted to achieve a sliding contact with the internal wall of body 10, and an elongated cup portion 31 adapted to receive a stem 32 on the bushing 18, which stem is provided for manual adjustment of the bushing when the cap 13 and the retainer element 28 are removed. The cap 13 has a cylindrical portion 33 extending into the interior of the body 10 and engageable, through an anti-friction ring 34, with the retainer element 28 in surrounding relation to the cup-like extension 31 thereof. The cap 13, by rotary advance into the end of the body 10, may advance the retainer element 28 to a seat upon the bushing 18 whereby to define a continuous line of positive contact from end to end of the nozzle device with a corresponding consistency of dimension, or, the continuous line of contact may be achieved through the surface 26, ring 24 and spacer 23, in which case the rotary advance of the cap 13 into the body may be limited to a selected torque load.

The operation of the sealing assembly will largely be self evident from the drawing and preceding description of the parts. The tapered surface 26 is utilized, in conjunction with the backup spacer member 23, to apply a radial expansive force to the ring seal, in conjunction with inward adjustment of the cap 13, whereby to apply a compressive force to the ring of a magnitude adequate to the sealing task at hand. The spacer member 23 is, as noted, of a diameter sufficient to achieve a telescoping relation with the extremity of extension 27 on the member 28. Accordingly, the end of the member 23 may enter the space between surface 26 and the wall of the body 10 to force the ring 24 over such tapered surface in response to and as a function of advance of the cap 13.

As before seen, the parts may be dimensioned in such manner that by turning the cap 13 inward its fullest extent and thereby seating the extension 27 on the bushing 18, a proper predetermined amount of compression is imparted to the ring 24. Alternatively, the desired amount of compression may be calculated in terms of inch or foot pounds of torque, and the cap 13 turned up until the selected torque loading is reached.

The retainer member 28 moves axially in response to rotary turning motion of the cap 13 which advances into the body 10 in response to such turning motion because of its screw threaded connection in the body. The anti-friction member 34, which may be suitably impregnated to resist sticking of the parts, enables the member 28 to move axially without rotating, which motion might be damaging to the surface of the ring 24.

The spacer member 23 could, of course, be made integral with the bushing 18. The illustrated embodiment represents a modification of an existing nozzle device in which the annular groove 22 was used to hold a conventional O-ring for sealing.

The internal wall of the body 10 contacted by the sealing ring 24 may be considered to be a bore 35. The spacer member 23, the portion 29 of member 28 and the surface 26 thereof may be considered to define an annular groove to receive the ring 24, such parts being adjustable to achieve on account of the inclination of the surface 26 a progressive compression of the ring 24.

What is claimed is:

A static fluid sealing assembly including relatively movable interfitting parts defining an annular groove, and a compressible hollow metal O-ring in said groove, said O-ring having inner and outer peripheries, characterized in that said parts comprise a first surface approximately parallel to the longitudinal axis of said O-ring in contacting and supporting relation to one periphery of said O-ring, a back-up wall in contacting and supporting relation to one side of the O-ring, and a second surface inclined with respect to said first surface and extending from the opposite side of said O-ring into contacting and supporting relation to the other periphery of said O-ring, said back-up wall and said second surface being relatively longitudinally adjustable to apply a thrust to said O-ring approximately perpendicular to said first surface producing a radial compression of the O-ring, said second surface having a relatively low angle of inclination providing for sliding contact thereof substantially exclusively with the said other periphery of said O-ring.

References Cited in the file of this patent

UNITED STATES PATENTS

| | | |
|---|---|---|
| 2,451,941 | Glover et al. | Oct. 19, 1948 |
| 2,772,900 | Campbell | Dec. 4, 1956 |
| 2,774,629 | Noon et al. | Dec. 18, 1956 |
| 2,806,740 | Fredrickson et al. | Sept. 17, 1957 |
| 2,831,714 | Thorburn | Apr. 22, 1958 |
| 2,837,360 | Ladd | June 3, 1958 |

FOREIGN PATENTS

| | | |
|---|---|---|
| 264,524 | Great Britain | Feb. 2, 1928 |
| 1,077,463 | France | Apr. 28, 1954 |

OTHER REFERENCES

Pamphlet: Engineering Data, "Self Energized Metallic O-Rings" by United Aircraft Products, Inc., Box 1025, Dayton, Ohio, published May 18–19, 1954, 14 pages. (A copy in Division 29 of the Patent Office.)